United States Patent
Fujita et al.

(10) Patent No.: US 6,814,420 B2
(45) Date of Patent: Nov. 9, 2004

(54) IMAGE PROCESSING METHOD AND APPARATUS, STORAGE MEDIUM AND PROGRAM

(75) Inventors: Takashi Fujita, Kanagawa (JP); Yuji Akiyama, Kanagawa (JP); Manabu Yamazoe, Tokyo (JP); Ryosuke Iguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/254,517

(22) Filed: Sep. 26, 2002

(65) Prior Publication Data

US 2003/0063145 A1 Apr. 3, 2003

(30) Foreign Application Priority Data

Oct. 1, 2001 (JP) .................................. 2001-305407

(51) Int. Cl.⁷ ............................................... B41J 2/205
(52) U.S. Cl. ............................................ 347/15; 347/19
(58) Field of Search ............................... 347/19, 43, 15; 358/1.9, 1.1

(56) References Cited

U.S. PATENT DOCUMENTS 5,452,017 A    9/1995  Hickman .................... 348/646
5,731,818 A  * 3/1998  Wan et al. .................. 345/590
6,269,184 B1   7/2001  Spaulding et al. .......... 382/167

FOREIGN PATENT DOCUMENTS

| EP | 0 481 525 A2  | 10/1991 | ............ H04N/1/46 |
| EP | 0 635 971 A2  | 7/1994  | ............ H04N/1/46 |
| EP | 0 720 352 A1  | 12/1995 | ............ H04N/1/62 |
| JP | 2000 092337 A | 3/2000  |                       |

OTHER PUBLICATIONS

Patent Abstracts of Japan, vol. 2000, No. 6, (Sep. 22, 2000) & JP 2000 092337 A (Mar. 31, 2000), Abstract.

* cited by examiner

*Primary Examiner*—Thinh Nguyen
(74) *Attorney, Agent, or Firm*—Fitzpatrick, Cella, Harper & Scinto

(57) ABSTRACT

Main actual color is reproduced unsatisfactory in some cases according to prior art. An image processing method is provided in which the component values of hue, saturation and lightness of an image represented by image data are independently changed. The hue change amount is made different at each hue angle, the saturation change amount is made different for each hue angle and each saturation value, and the lightness change amount is made different at each hue angle.

53 Claims, 6 Drawing Sheets

IMAGE PROCESSING METHOD AND APPARATUS, STORAGE MEDIUM AND PROGRAM

BACKGROUND OF THE INVENTION

1. Field of the Invention

The present invention relates to an image processing method capable of improving the quality of data of an image digitally photographed or the like, and to an image processing apparatus, a storage medium and a program.

2. Description of the Related Art

The recent development in ink jet printing techniques allows to obtain a printed image having a better quality than a conventional printed image, by utilizing a digital camera with a large number of pixels and ink jet printing techniques.

There are, however, still some points to be improved in the quality of an image digitally photographed. Even if color matching of high fidelity in terms of numerical values is performed, color reproduction of a printed image is not always fine. It is important to determine how recorded colors are reproduced.

For example, conventional color matching for a monitor provides color reproduction within a monitor color reproduction range and does not utilize the maximum color reproduction range which a printer has inherently. Therefore, depending upon printers and media, main colors of a landscape or portrait photograph may be reproduced in colors which are not fine.

Some color is fine if it is reproduced vividly, and another color such as tint is fine if it is reproduced naturally. If all colors are modified equally, it is difficult to realize fine color reproduction. There is a tradeoff between color which is preferably made vivid and color which is preferably changed less. It is necessary to convert color by considering the relation between hue, saturation and lightness in order to reproduce fine color of high fidelity.

SUMMARY OF THE INVENTION

It is an object of the invention to print an image with vivid and fine color reproduction by setting the conversion conditions in accordance with input image data and to improve the quality of an output image, particularly landscape photographs, portrait photographs and the like, by reproducing fine main colors like original colors or emphasized colors.

In order to achieve the above object of the invention, there is provided an image processing method of changing independently component values of hue, saturation and lightness of an image represented by image data, wherein a change amount of the hue is made different at each hue angle and a change amount of the saturation is made different at each hue angle and each saturation value.

With the structure described above, a plurality of specific hues are shifted to target hues, the change quantity of saturation is set different for at hue angle and each saturation data, and the change quantity of lightness is set different at each hue angle. Accordingly, each print image can reproduce color near actual color and preferred color. Color preferred to be vivid can be made more vivid and color preferred to be suppressed can be made as it is.

Other objects and advantages of the present invention will become apparent from the following description of embodiments to follow.

DETAILED DESCRIPTION OF THE PREFERRED EMBODIMENTS

Embodiments of the invention will be described in detail with reference to the accompanying drawings.

<First Embodiment>

Figure 1:
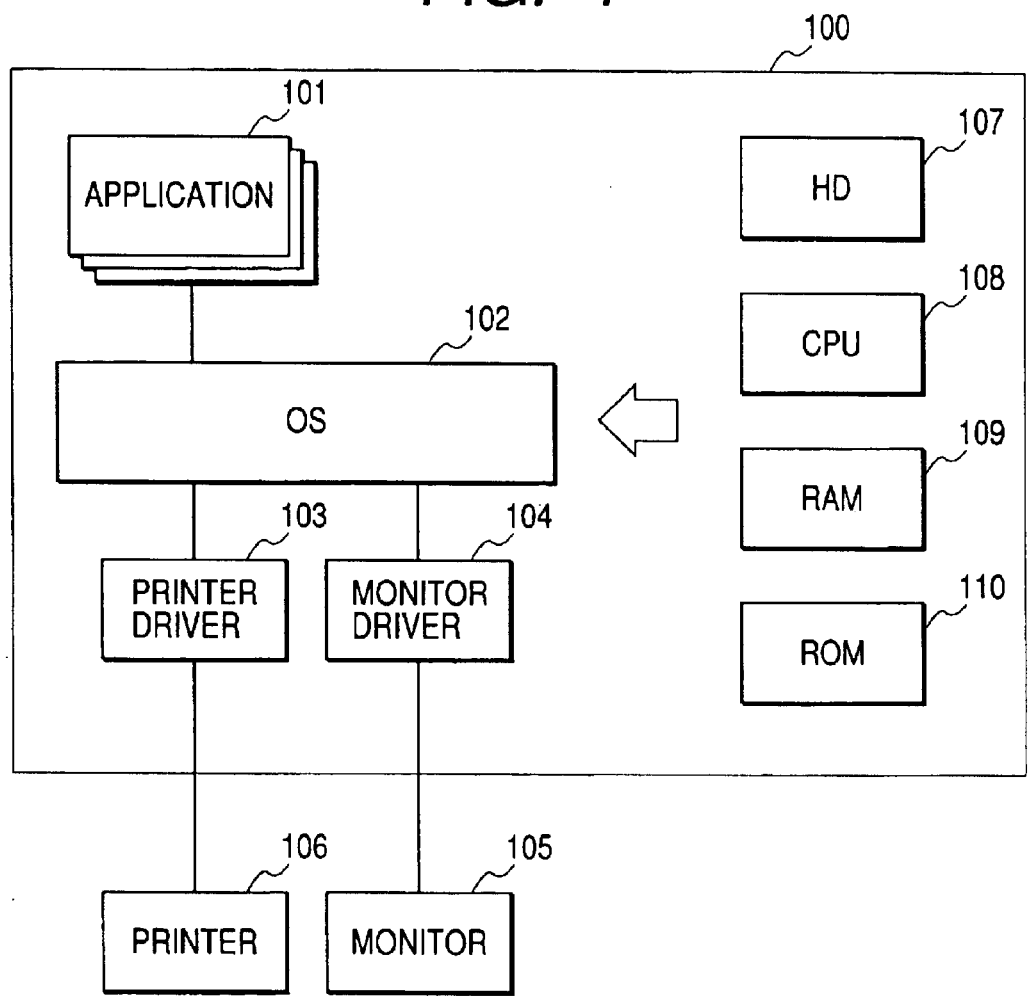
FIG. 1 is a block diagram showing the structure of a print system according to an embodiment of the invention.

FIG. 1 is a block diagram showing the outline structure of a print system according to the first embodiment of the invention. This system is constituted of a host computer 100, a printer 106 and a monitor 105. The printer 106 may be an ink jet type printer which is connected to the host computer 100 to communicate bidirectionally.

The host computer 100 has an OS (operating system) 102, application software 101, a printer driver 103 and a display driver 104. The application software 101 includes word processor software, spreadsheet software, photo retouching software, image processing software, Internet browser software and the like, respectively executed under the control of OS 102. The printer driver 103 generates print data of an output image by processing various drawing commands (image drawing command, text drawing command and graphics drawing command) issued by the application software 101. The display driver 104 processes the various drawing commands issued by the application program 101 to drive the monitor 106 and display an image. The printer driver 103 and display driver 104 are realized by software.

The host computer 100 has a central processing unit CPU 108, a hard disk 107, a random access memory (RAM) 109, a read-only memory (ROM) 110 and the like which are hardware capable of being operated by the above-described software. CPU 108 processes signals in accordance with each process associated with the above-described software. Such software is stored in advance in ROM 110 or the hard disk HD 107 to be driven by a hard disk driver, and read when necessary. RAM 109 is used as a working area or the like when CPU 108 processes signals.

An embodiment shown in FIG. 1 may be realized, for example, by a currently prevailing personal computer compatible with an AT of IBM Corporation using a Windows OS of Microsoft Corporation which computer is connected to a monitor and a printer and installed with optional print application software.

In the print system constructed as above, by viewing an image displayed on the monitor 105 by an application 101, a user can create image data constituted of text data such as character data, graphics data such as figures and scene data such as natural scene data.

When the user instructs to output a print image of the created image data, the application 101 issues a print request and drawing commands to OS 102, the drawing commands including a graphics drawing command constituted of graphics data, a scene drawing command constituted of scene data and a text drawing command constituted of text data. Upon reception of the print request from the application, OS 102 sends the drawing commands to the printer driver 103 of the printer which prints out an image.

The printer driver 103 processes the print request and drawing commands supplied from OS 102, generates print data capable of being printed with the printer 106, and supplies the print data to the printer 106. In this case, if the printer 106 is a raster printer, in response to the drawing commands from OS 102 the printer driver 103 sequentially performs an image data conversion process and rasterizes the drawing commands in an RGB 24-bit page memory. After all drawing commands are rasterized, the contents in the RGB 24-bit page memory are converted into data of the type which the printer 106 can print, e.g., into CMYK data which is in turn transferred to the printer 106.

Figure 2:
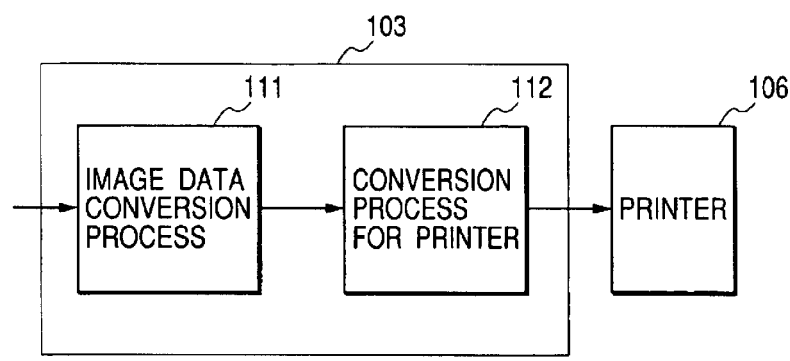
FIG. 2 is a block diagram illustrating processes to be executed by a printer driver of the print system of the embodiment.

FIG. 2 is a block diagram illustrating processes to be executed by the printer driver 103. The processes of the printer driver 103 are classified mainly into an image data conversion process and a conversion process for printer.

The image data conversion process 111 converts image data of luminance signals (red) R, (green) G and (blue) B included in the drawing commands supplied from OS 102, in a manner to be described later. The conversion process 112 for printer rasterizes the drawing commands constituted of image data and converted by the image data conversion process 111 and stores a raster image in a the of 24-bit RGB page memory. The conversion process 112 for printer generates cyan (C), magenta (M), yellow (Y), black (B) data dependent upon the color reproduction of the printer 105 which prints each pixel, and supplies the data to the printer 105.

In the image data conversion process 111, scene data constituting the scene drawing command is converted. For example, if the image data contains graphics data and scene data, the scene data is extracted from the image data and subjected to the conversion process for printer.

Figure 3:
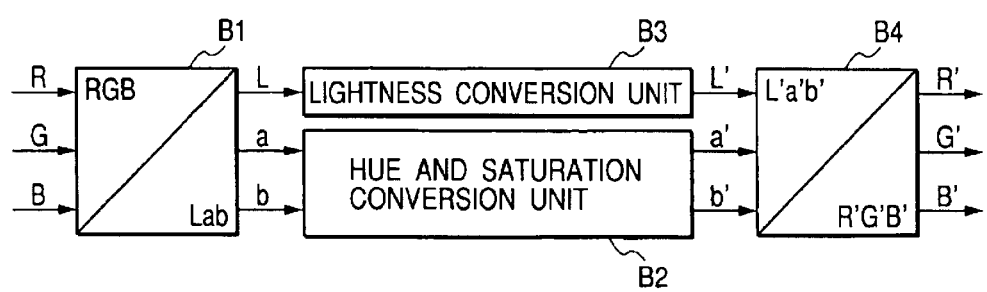
FIG. 3 is a block diagram illustrating an image data conversion process, mainly a signal conversion process, to be executed by the printer driver.
Figure 4:
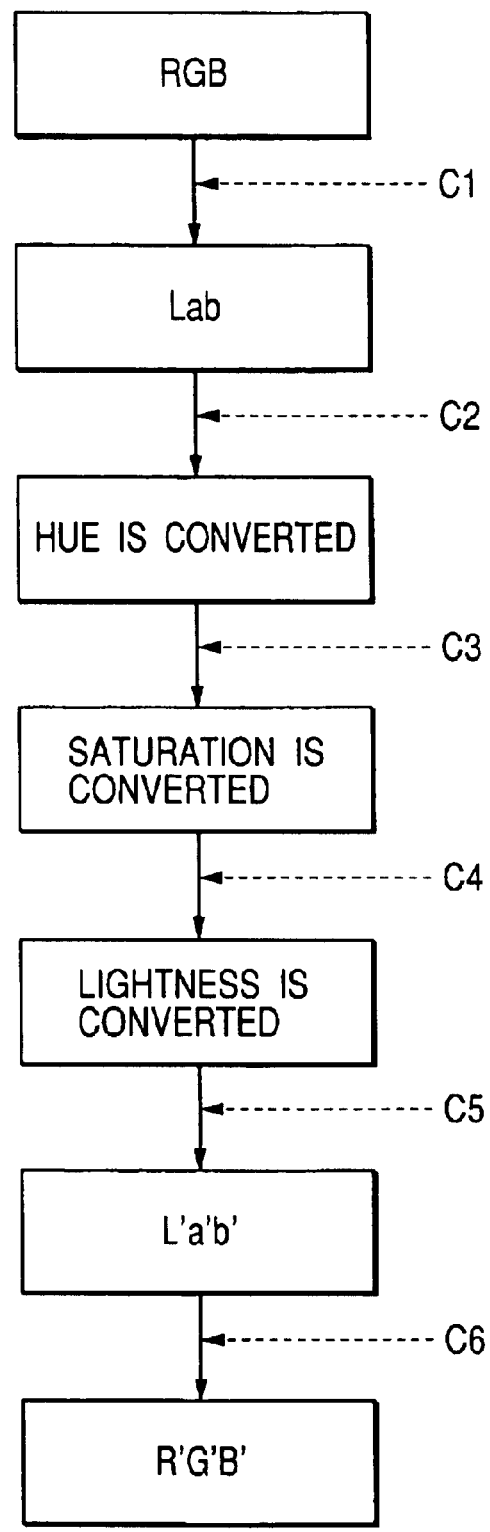
FIG. 4 is a flow chart illustrating the conversion process.

FIG. 3 illustrates the concept of image signal conversion, and FIG. 4 is a flow chart illustrating the conversion processes. The conversion processes will be described by referring mainly to the flow chart shown in FIG. 4.

Referring to FIG. 4, at the first Step C1 input RGB image signal data is converted into lightness L data and tone data a and b of an image (B1 in FIG. 3).

Conversion from RGB data into Lab data may be performed by well known calculations or by using a correspondence look-up table.

Next, by using a and b, a specific hue is converted into a target hue at Step C2. At Step C3 by using the a and b data after the hue conversion, a saturation conversion curve is obtained which shows a change in the saturation in accordance with the hue and saturation, and the saturation is converted by using the saturation conversion curve (B2 in FIG. 3). Next, at Step C4, the lightness L is converted by using a lightness conversion curve which shows a lightness value relative to the hue (B3 in FIG. 3). Instead of the lightness conversion curve, only the γ value may be changed by using an exponential function such as $L'=L^\gamma$. The a', b' and L' data after conversions at Steps C2, C3 and C4 is converted into R'G'B' signals (B4 in FIG. 3).

Similar to the conversion from RGB into Lab, conversion from Lab data into RGB data may be performed by well know calculations or by using a correspondence look-up table.

Conversion of Hue, Saturation and Lightness

The conversion of hue, saturation and lightness will be further detailed.

For the conversion of hue, saturation and lightness, RGB image signal data is first converted into lightness L data and tone data a and b of an image.

Next, the hue value H and saturation value S of each pixel of image data are calculated from the lightness data L and tone data a and b. The calculation equations are given by:

$$H=\tan^{-1}(a/b) \quad (1)$$

$$S=(a^2+b^2)^{1/2} \quad (2)$$

Figure 5:
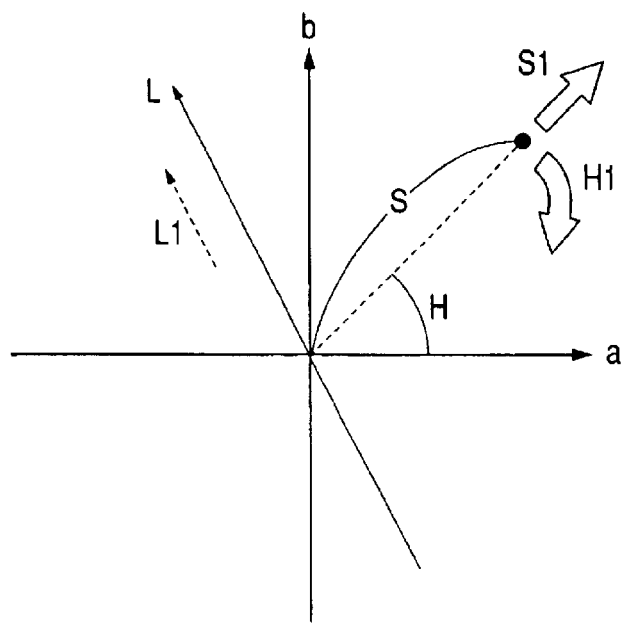
FIG. 5 is a schematic diagram showing hue H, saturation S and lightness L to be converted by the conversion process.

The hue H, saturation S and lightness L are converted by utilizing a graph shown in FIG. 5 which is a three-dimensional graph having L-, a- and b-axes. At Step H1 the hue H is changed to change color tone, at Step S1 the saturation S is changed toward a plus (+) direction to make color vivid, and at Step L1 the lightness L is changed toward a minus (−) direction to make the lightness dark (the density dense).

In this embodiment, by changing the hue, saturation and lightness of image data, a specific hue is converted into a target hue, the saturation is converted by using a saturation conversion curve at the converted hue to be described later, and the lightness is converted at the converted hue in accordance with the lightness conversion curve.

Hue

Next, the hue conversion process will be detailed.

Figure 6:
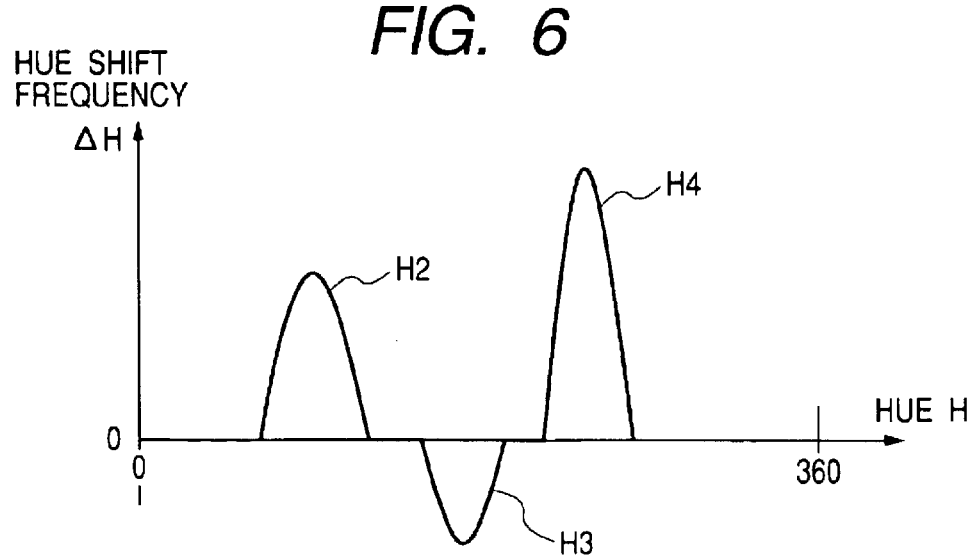
FIG. 6 is a diagram showing a hue conversion curve to be used by the conversion process.

First, a shift amount ΔT is obtained in accordance with a hue angle. FIG. 6 shows a hue conversion curve showing a hue shift amount at each hue. As seen from this hue conversion graph, a specific hue is converted to a target hue without uniformly shifting all the hue angles. Since each specific hue is set to a target hue, local hue conversion is possible without influencing other colors. For example, assuming that the shift amount ΔH at the hue angle of 120° is set to +10° in this hue conversion graph, the color at the hue angel 120° is converted into the color at the hue angle of 130°. The hue shift amount ΔH is set in such a manner that color is not inverted. For example, when the hue angle 120° is converted into 130°, the hue angles 121° to 129° are shifted to 130° or larger by all means. H2 shown in FIG. 6 indicates that the hue of yellow green color is shifted toward the plus direction, i.e., the green direction. With this setting, yellow green of trees and plants can be vividly reproduced. H3 indicates that the hue of blue green color is shifted toward the minus direction, i.e., the green direction. With this setting, blue green of trees and plants can be vividly and naturally reproduced. H4 indicates that the hue of cyan is shifted toward the plus direction, i.e., the reddish blue direction. With this setting, blue sky having deep vividness can be reproduced. The hue conversion may be performed by utilizing lattice points instead of the graph.

Saturation

Next, the saturation conversion process will be detailed.

Figure 7A:
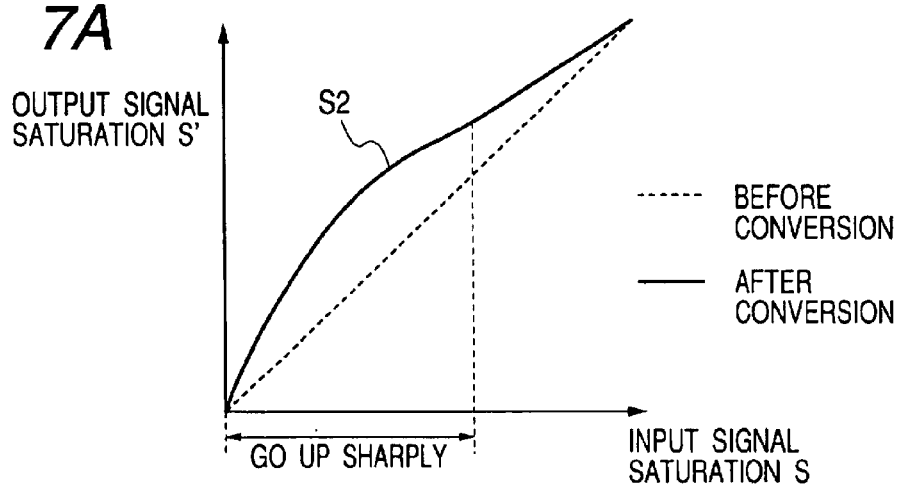
FIGS. 7A, 7B and 7C are diagrams showing saturation conversion curves to be used by the conversion process.
Figure 7B:
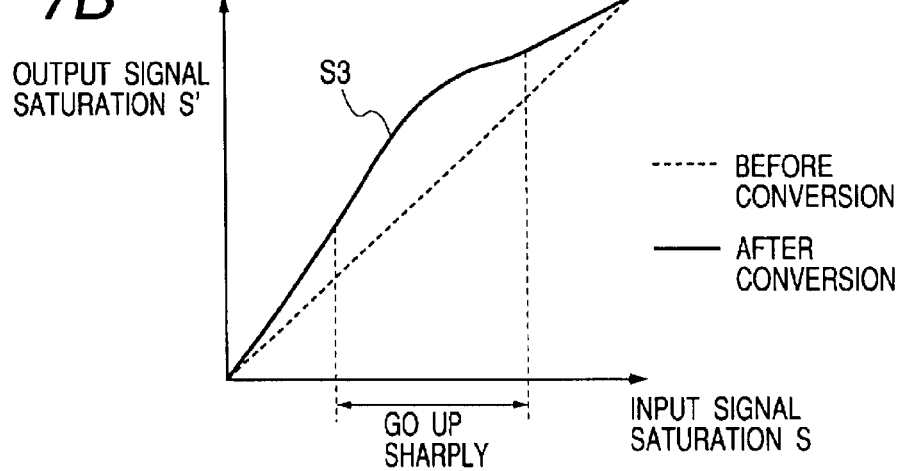
Figure 7C:
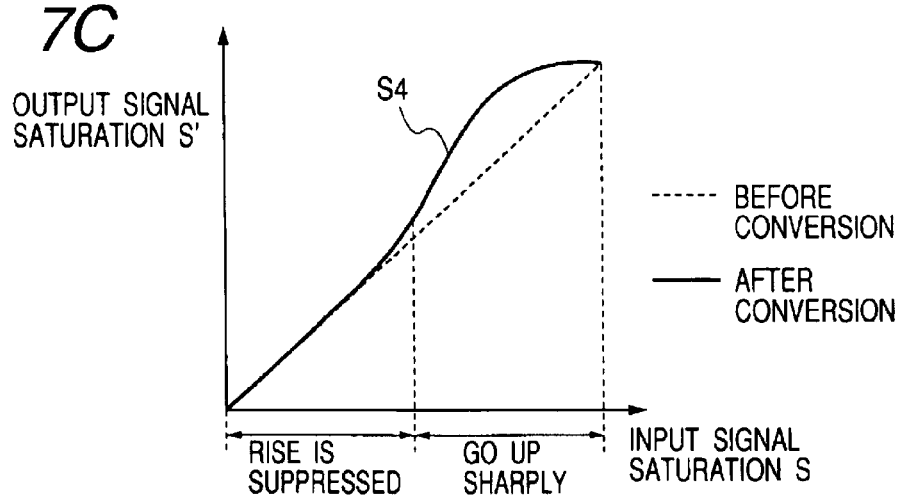
Figure 8:
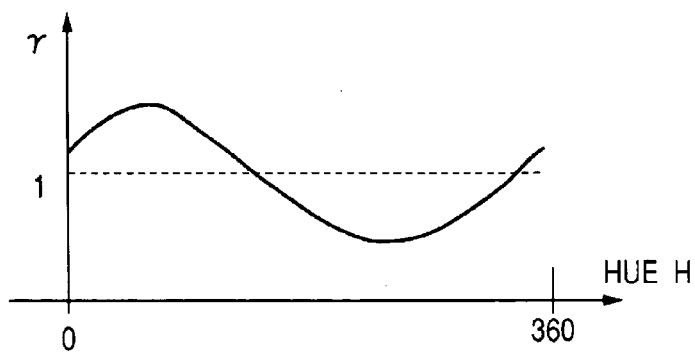
FIG. 8 is a diagram showing a lightness conversion curve to be used by the conversion process.

In this example, the saturation is converted in accordance with the converted hue angle. FIGS. 7A to 7C are saturation conversion curves indicating the saturation conversion quantity at each specific hue. The saturation conversion curves shown in FIGS. 7A to 7C are assigned to respective divided hues. The saturation conversion quantity is set different for each hue. For example, the saturation of color having the converted hue angle of 130° is converted by using the saturation conversion curve prepared for the hue angle of 130°. The saturation is converted differently at each value. FIGS. 7A to 7C show three saturation conversion curves. A curve S2 shown in FIG. 7A increases the saturation greatly in the low saturation region starting from the saturation of 0 and suppresses the saturation in the high saturation region more than the low saturation region. With this setting of S2, for example, if vivid color such as green is preferred, color like achromatic color or withered color of trees and plants can be reproduced as having vivid color. A curve S3 shown in FIG. 7B increases the saturation greatly in the middle saturation region which couples smoothly the low saturation region starting from the saturation of 0 and the high saturation region. With this setting of S3, for example, if vivid color such as blue sky color is preferred, vivid color of the blue sky can be reproduced by suppressing the low saturation region such as white snow near to the saturation of 0 and increasing greatly the saturation of blue sky color. A curve S4 shown in FIG. 7C suppresses the saturation in the low saturation region and increases the saturation in the high saturation region as much as possible. With this setting of S4, for example, if the low saturation region of orange or yellow represents the color of human tint and the high saturation region of a red sunset, fruit or the like is preferred to be vivid, it is possible to maintain natural and change-suppressed color of the human tint and vivid color of the red sunset, fruit or the like.

Namely, the saturation conversion curve changes if necessary the saturation greatly for an image preferred to be loud-color in excess of the color reproduction range of the monitor 106, and conversely does not convert or suppress the saturation for an image which may become unsatisfactory (unnatural color, disturbed gradation) if the saturation is changed. The color reproduction range of the printer in excess of the monitor color reproduction range can therefore be used efficiently to convert image color into preferred color. If the saturation conversion curves are to be prepared for each hue angle at an interval of 10°, there are thirty five saturation conversion curves and the regions between these curves are obtained by smoothing of an interpolation process. For example, if the saturation at the hue angle of 137° is to be converted, the region between the saturation conversion curves at the hue angles 130° and 140° is obtained by smoothing of an interpolation process.

Lightness

Next, the lightness conversion process will be detailed.

Figure 9:
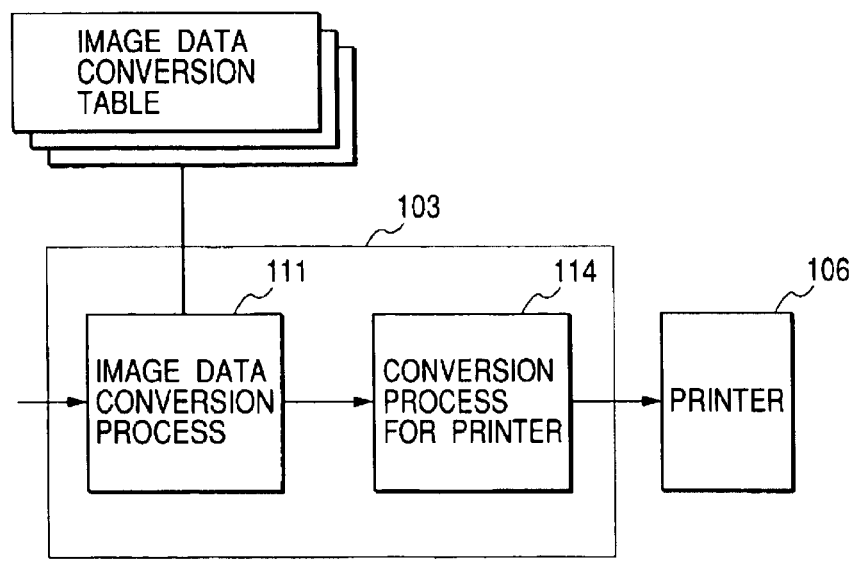
FIG. 9 is a block diagram illustrating a process to be executed by a printer driver of a print system according to a second embodiment of the invention.

In this example, in accordance with the converted hue angle, for example, the γ value ($L'=100\times(L/100)^{1/\gamma}$) is converted. FIG. 9 shows a lightness conversion curve indicating a lightness conversion quantity at each hue angle. The lightness conversion process is performed by utilizing this curve. For example, if the shift amount at the hue angle of 120° is set to +10° in the hue conversion graph, the hue angle is converted into 130° so that the lightness conversion is performed by using the γ value at 130° in this lightness conversion curve. The γ value may be calculated from an equation different from that described just above.

In the manner described above, the Lab data after the conversion of hue, saturation and lightness is changed to RGB data to obtain converted image data R'G'B'. The order of converting hue, saturation and lightness may be changed.

Colors of an image have the regions whose hue, saturation and lightness are desired to be strengthened, weakened or unchanged (zero conversion). Such colors can be changed as desired.

According to the conversion method of this embodiment, by considering the relation between hue, saturation and lightness of subject color, it becomes possible to convert image data capable of obtaining optimum color reproduction. Accordingly, a print image has vivid and preferred color reproduction, and the quality of the print image can be improved by the reproduction of color near actual color, emphasized color, or preferred color of landscape, portrait and the like.

Although the Lab data is used for the conversion, the color space to be used for the conversion is not limited only thereto, but other color spaces such as YCC and Luv may also be used.

The invention is not limited to the above-described embodiment, but various modifications are possible without departing from the scope of the present invention.

<Second Embodiment>

In the second embodiment, the print system shown in FIG. 1 is used in which the printer driver shown in FIG. 2 processes a print request and drawing commands supplied from OS 102 and generates print data capable of being printed with the printer 105 and to be supplied to the printer 105, similar to the first embodiment.

FIG. 9 is a block diagram illustrating the processes to be executed by the printer driver 103 of the second embodiment. In the first embodiment, the image data conversion process 111 converts image data of luminance signals R, G and B included in the drawing commands supplied from OS 102. In the second embodiment, however, an image data conversion process 113 converts image data in accordance with R, G and B look-up tables formed beforehand in accordance with the calculation results of the first embodiment. A conversion process 114 for printer rasterizes the drawing commands constituted of image data and converted by the image data conversion process 113, and sequentially stores a raster image in a the of 24-bit RGB page memory. The conversion process 114 for printer generates cyan (C), magenta (M), yellow (Y), black (B) data dependent upon the color reproduction of the printer 105 which prints each pixel, and supplies the data to the printer 105.

Next, the image data conversion process 113 will be detailed.

In the first embodiment, the RGB data is processed to convert image data. In the second embodiment, look-up tables (image data conversion tables) are formed beforehand for the conversion of image data, the look-up tables indicating the relation between original RGB values and converted RGB values.

The image data conversion tables are formed in advance in accordance with the signal conversion described with FIG. 3 and the calculations described with the flow chart of FIG. 4.

The image data conversion tables may be a plurality of tables storing different conversion schema matching the applications of print images. In this case, the image data conversion process 113 selects an optimum image data conversion table to perform the conversion process.

In this embodiment, the image processing method is featured in that the component values of the hue, saturation and lightness of an image represented by image data are changed. A specific hue is converted into a target hue, different saturation conversion curves for changing the saturation degree in accordance with the hue data and saturation data are obtained to perform the saturation conversion by using the curves. The lightness conversion is performed by using the lightness conversion curve indicating a different lightness at each hue. The light conversion curve may change only the γ value by using an exponential function such as $L'=L^{\gamma}$.

Also in the conversion method of this embodiment, by considering the relation between hue, saturation and lightness of subject color, it becomes possible to convert image data so as to obtain optimum color reproduction. Accordingly, a print image has vivid and preferred color reproduction, and the quality of the print image can be improved by the reproduction of color near actual color, emphasized color, or preferred color of landscape, portrait and the like.

Although the Lab data is used for the conversion, the color space to be used for the conversion is not limited only thereto, but other color spaces such as YCC and Luv may also be used.

The invention is not limited to the above-described embodiment, but various modifications are possible without departing from the scope of the present invention.

<Another Embodiments>

The other embodiment will be described. For example, although a process of reproducing vivid blue green of trees and plants is preferable for a landscape scene, making blue green color of a graphics image vivid is not necessarily preferred. From this viewpoint, the change amounts or conversion tables different from those used for the conversion of hue, saturation and lightness in the first and second embodiments are used selectively between the scene image and graphics image taken with a digital camera or the like and to be printed, in accordance with user setting of a printer driver. The structure of this embodiment will be described in the following.

In this embodiment, the printer driver 103 shown in FIG. 1 checks its setting made by a user via a user interface to confirm which image data is to be processed. In accordance with the confirmed image data, the conversion contents or conversion tables to be used by the image data conversion processes 111 and 113 can therefore be changed. In this case, the printer driver 103 may check not only the type of image such as a scene image and a graphics image, but also the type of a cartridge to be set by the printer driver (or presence/absence of a cartridge for scene image), the type of paper (glossy paper and the like) or the type of print quality (high quality print and the like) to control the conversion contents and conversion tables of the first and second embodiments.

If an automatic print mode is set by the printer driver, which mode identifies the type of an image to be printed by performing an image recognition process, the image processing apparatus may be controlled to perform the conversion process of the first and second embodiments in accordance with the image recognition results. The image recognition process includes a well known recognition process of recognizing a human face by recognizing the existence of eyes and the human tint near the recognized eyes, a recognizing process of identifying a landscape image including sea and sky by judging the existence rate of color corresponding to blue of the sea and sky on the image.

With the structure described above, the processes of the first and second embodiment can be performed by checking the setting of the printer driver so that the quality of an image can be improved by considering the type of an image to be printed.

The invention is also applicable to a system having a plurality of apparatuses (e.g., a host computer, an interface apparatus, a reader, a printer and the like) or to a single apparatus (e.g., a copier, a facsimile or the like).

The scope of the invention contains also the case wherein software program codes such as shown in FIG. 4 and FIGS. 7A to 7C realizing the function of each embodiment described above are supplied to a computer (CPU or MPU) of the apparatus or system connected to various devices realizing the embodiment function, and the computer operates the devices in accordance with the stored programs.

In this case, the software program codes themselves realize the embodiment function. Therefore, the program codes themselves and means for supplying the program codes to a computer, e.g., a storage medium storing the program codes, constitute the present invention.

The storage medium for storing such program codes may be a floppy disk, a hard disk, an optical disk, a magneto optical disk, a CD-ROM, a magnetic tape, a nonvolatile memory card, a ROM or the like.

It is obvious that the program codes are included in the embodiment of the invention, wherein not only the computer executes the supplied program codes to realize the embodiment function but also the program codes in cooperation with an OS (operating system) running on the computer or with another application or the like realize the embodiment function.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

Although the invention has been described in connection with preferred embodiments, the invention is not limited to the above-described embodiment, but various modifications are possible without departing from the scope of the present invention.

The invention is applicable to a system having a plurality of apparatuses or to a single apparatus. It is obvious that the invention is applicable to the case wherein the invention is realized by supplying a program to a system or an apparatus.

As described so far, a specific hue is shifted to a target hue, the change quantity of saturation is set different at each hue angle and saturation data, and the change quantity of lightness is set different at each hue angle. Accordingly, each print image can reproduce color near actual color and preferred color. Color preferred to be vivid can be made more vivid and color preferred to be suppressed can be made as it is.

What is claimed is:

1. An image processing method of changing independently component values of hue, saturation and lightness of an image represented by image data, wherein a change amount of the hue is made different at each hue angle and a change amount of the saturation is made different at each hue angle and each saturation value, and wherein a saturation value is partitioned into a plurality of sections for each hue angle in each divided hue angle group, and a target saturation value is set to each saturation value to change the saturation value.

2. An image processing method according to claim 1, wherein a change amount of the lightness is further made different at each hue angle.

3. An image processing method according to claim 1, wherein the hue angle is divided into a plurality of hue angle groups, and a target hue value is set to each hue value in each divided hue angle group to change the hue value.

4. An image processing method according to claim 1, wherein a color table is formed based upon a result of changing the hue and saturation values in a predetermined color space.

5. An image processing method comprising:
a first hue conversion step, of shifting a first hue of image data by a first hue angle;
a second hue conversion step, of shifting a second hue of the image data different from the first hue by a second hue angle different from the first hue angle;

a conversion step, of converting at least lightness or saturation of the image data converted in said first and second hue conversion steps in accordance with conversion characteristics determined by hue angles of the image data after the hue conversion; and a shifting step, of shifting the hues having the hue angles between hue angles of the hues before and after conversion in said first hue conversion step to at least the hue after the conversion.

6. An image processing method according to claim 5, wherein conversion characteristics for saturation determined by the hue angle obtained after said first and second hue conversion steps are prepared for each predetermined hue angle, and conversion characteristics for saturation at a hue angle different from the predetermined hue angle are determined through interpolation between a plurality of prepared conversion characteristics.

7. An image processing method according to claim 5, wherein the image data after the hue conversion is converted into image data in excess of a monitor color reproduction range by using the conversion characteristics for saturation.

8. An image processing method according to claim 5, wherein hue shift and conversion characteristics at said first and second hue conversion steps are determined by setting of a printer driver.

9. An image processing apparatus for changing independently component values of hue, saturation and lightness of an image represented by image data, comprising:

first conversion means for performing conversion in such a manner that a change amount of the hue is made different at each hue angle; and second conversion means for performing conversion in such a manner that a change amount of the saturation is made different at each hue angle and each saturation value, wherein a saturation value is partitioned into a plurality of sections for each hue angle in each divided hue angle group, and a target saturation value is set to each saturation value to change the saturation value.

10. An image processing apparatus according to claim 9, wherein a change amount of the lightness is further made different at each hue angle.

11. An image processing apparatus according to claim 9, wherein the hue angle is divided into a plurality of hue angle groups, and a target hue value is set to each hue value in each divided hue angle group to change the hue value.

12. An image processing apparatus according to claim 9, wherein a color table is formed based upon a result of changing the hue and saturation values in a predetermined color space.

13. An image processing apparatus comprising:

first hue conversion means for shifting image data having a first hue by a first hue angle;

second hue conversion means for shifting the image data having a second hue different from the first hue by a second hue angle different from the first hue angle;

conversion means for converting at least lightness or saturation of the image data converted by said first and second hue conversion means in accordance with conversion characteristics determined by hue angles of the image data after the hue conversion; and shifting means for shifting the hues having the hue angles between hue angles of the hues before and after conversion by said first hue conversion means to at least the hue after the conversion.

14. An image processing apparatus according to claim 13, wherein conversion characteristics for saturation determined by the hue angle obtained after conversion by said first and second hue conversion means are prepared for each predetermined hue angle, and conversion characteristics for saturation at a hue angle different from the predetermined hue angle are determined through interpolation between a plurality of prepared conversion characteristics.

15. An image processing apparatus according to claim 13, wherein the image data after the hue conversion is converted into image data in excess of a monitor color reproduction range by using the conversion characteristics for saturation.

16. An image processing apparatus according to claim 13, wherein hue shift and conversion characteristics to be used by said first and second hue conversion means are determined by setting of a printer driver.

17. A storage medium storing a program for changing independently component values of hue, saturation and lightness of an image represented by image data, the program comprising:

a first conversion step, of performing conversion in such a manner that a change amount of the hue is made different at each hue angle; and a second conversion step, of performing conversion in such a manner that a change amount of the saturation is made different at each hue angle and each saturation value, wherein a saturation value is partitioned into a plurality of sections for each hue angle in each divided hue angle group, and a target saturation value is set to each saturation value to change the saturation value.

18. A storage medium according to claim 17, wherein in the program a change amount of the lightness is further made different at each hue angle.

19. A storage medium according to claim 17, wherein in the program the hue angle is divided into a plurality of hue angle groups, and a target hue value is set to each hue value in each divided hue angle group to change the hue value.

20. A storage medium according to claim 17, wherein a color table is formed based upon a result of changing the hue and saturation values in a predetermined color space.

21. A storage medium storing a program which comprises:

a first hue conversion step, of shifting image data having a first hue by a first hue angle;

a second hue conversion step, of shifting the image data having a second hue different from the first hue by a second hue angle different from the first hue angle;

a conversion step, of converting at least lightness or saturation of the image data converted in said first and second hue conversion steps in accordance with conversion characteristics determined by hue angles of the image data after the hue conversion; and a shifting step, of shifting the hues having the hue angles between hue angles of the hues before and after conversion in said first hue conversion steps to at least the hue after the conversion.

22. A storage medium according to claim 21, wherein conversion characteristics for saturation determined by the hue angle obtained by said first and second hue conversion means are prepared for each predetermined hue angle, and conversion characteristics for saturation at a hue angle different from the predetermined hue angle are determined through interpolation between a plurality of prepared conversion characteristics.

23. A storage medium according to claim 21, wherein the image data after the hue conversion is converted into image data in excess of a monitor color reproduction range by using the conversion characteristics for saturation.

24. A storage medium according to claim 21, wherein hue shift and conversion characteristics to be used by said first and second hue conversion steps are determined by setting of a printer driver.

25. A program for changing independently component values of hue, saturation and lightness of an image represented by image data, the program comprising:
a first conversion step, of performing conversion in such a manner that a change amount of the hue is made different at each hue angle; and
a second conversion step, of performing conversion in such a manner that a change amount of the saturation is made different at each hue angle and each saturation value,
wherein a saturation value is partitioned into a plurality of sections for each hue angle in each divided hue angle group, and a target saturation value is set to each saturation value to change the saturation value.

26. A program comprising:
a first hue conversion step, of shifting image data having a first hue by a first hue angle;
a second hue conversion step, of shifting the image data having a second hue different from the first hue by a second hue angle different from the first hue angle;
a conversion step, of converting at least lightness or saturation of the image data converted in said first and second hue conversion steps in accordance with conversion characteristics determined by hue angles of the image data after the hue conversion; and
a shifting step, of shifting the hues having the hue angles between hue angles of the hues before and after conversion in said first hue conversion steps to at least the hue after the conversion.

27. An image processing method of changing independently component values of hue, saturation and lightness of an image represented by image data, wherein a change amount of the hue is made different at each hue angle and a change amount of the saturation is made different at each hue angle and each saturation value, and wherein a color table is formed based upon a result of changing the hue and saturation values in a predetermined color space.

28. An image processing method according to claim 27, wherein a change amount of the lightness is further made different at each hue angle.

29. An image processing method according to claim 27, wherein the hue angle is divided into a plurality of hue angle groups, and a target hue value is set to each hue value in each divided hue angle group to change the hue value.

30. An image processing apparatus for changing independently component values of hue, saturation and lightness of an image represented by image data, comprising:
first conversion means for performing conversion in such a manner that a change amount of the hue is made different at each hue angle; and
second conversion means for performing conversion in such a manner that a change amount of the saturation is made different at each hue angle and each saturation value,
wherein a color table is formed based upon a result of changing the hue and saturation values in a predetermined color space.

31. An image processing apparatus according to claim 30, wherein a change amount of the lightness is further made different at each hue angle.

32. An image processing apparatus according to claim 30, wherein the hue angle is divided into a plurality of hue angle groups, and a target hue value is set to each hue value in each divided hue angle group to change the hue value.

33. A storage medium storing a program for changing independently component values of hue, saturation and lightness of an image represented by image data, the program comprising:
a first conversion step, of performing conversion in such a manner that a change amount of the hue is made different at each hue angle; and
a second conversion step, of performing conversion in such a manner that a change amount of the saturation is made different at each hue angle and each saturation value,
wherein a color table is formed based upon a result of changing the hue and saturation values in a predetermined color space.

34. A storage medium according to claim 33, wherein in the program a change amount of the lightness is further made different at each hue angle.

35. A storage medium according to claim 33, wherein in the program the hue angle is divided into a plurality of hue angle groups, and a target hue value is set to each hue value in each divided hue angle group to change the hue value.

36. A program for changing independently component values of hue, saturation and lightness of an image represented by image data, the program comprising:
a first conversion step, of performing conversion in such a manner that a change amount of the hue is made different at each hue angle; and
a second conversion step, of performing conversion in such a manner that a change amount of the saturation is made different at each hue angle and each saturation value,
wherein a color table is formed based upon a result of changing the hue and saturation values in a predetermined color space.

37. An image processing method comprising:
a first hue conversion step, of shifting a first hue of image data by a first hue angle;
a second hue conversion step, of shifting a second hue of the image data different from the first hue by a second hue angle different from the first hue angle; and
a conversion step, of converting at least lightness or saturation of the image data converted in said first and second hue conversion steps in accordance with conversion characteristics determined by hue angles of the image data after the hue conversion,
wherein conversion characteristics for saturation determined by the hue angle obtained after said first and second hue conversion steps are prepared for each predetermined hue angle, and conversion characteristics for saturation at a hue angle different from the predetermined hue angle are determined through interpolation between a plurality of prepared conversion characteristics.

38. An image processing apparatus comprising:
first hue conversion means for shifting image data having a first hue by a first hue angle;
second hue conversion means for shifting the image data having a second hue different from the first hue by a second hue angle different from the first hue angle; and
conversion means for converting at least lightness or saturation of the image data converted by said first and second hue conversion means in accordance with conversion characteristics determined by hue angles of the image data after the hue conversion, wherein conversion characteristics for saturation determined by the hue angle obtained by said first and second hue conversion means are prepared for each predetermined hue angle, and conversion characteristics for saturation at a hue angle different from the predetermined hue angle are determined through interpolation between a plurality of prepared conversion characteristics.

39. A storage medium storing a program which comprises:

a first hue conversion step, of shifting image data having a first hue by a first hue angle;

a second hue conversion step, of shifting the image data having a second hue different from the first hue by a second hue angle different from the first hue angle; and a conversion step, of converting at least lightness or saturation of the image data converted in said first and second hue conversion steps in accordance with conversion characteristics determined by hue angles of the image data after the hue conversion, wherein conversion characteristics for saturation determined by the hue angle obtained in said first and second hue conversion steps are prepared for each predetermined hue angle, and conversion characteristics for saturation at a hue angle different from the predetermined hue angle are determined through interpolation between a plurality of prepared conversion characteristics.

40. A program comprising:

a first hue conversion step, of shifting image data having a first hue by a first hue angle;

a second hue conversion step, of shifting the image data having a second hue different from the first hue by a second hue angle different from the first hue angle; and a conversion step, of converting at least lightness or saturation of the image data converted at said first and second hue conversion steps in accordance with conversion characteristics determined by hue angles of the image data after the hue conversion, wherein conversion characteristics for saturation determined by the hue angle obtained in said first and second hue conversion steps are prepared for each predetermined hue angle, and conversion characteristics for saturation at a hue angle different from the predetermined hue angle are determined through interpolation between a plurality of prepared conversion characteristics.

41. An image processing method comprising:

a first hue conversion step, of shifting a first hue of image data by a first hue angle;

a second hue conversion step, of shifting a second hue of the image data different from the first hue by a second hue angle different from the first hue angle; and a conversion step, of converting at least lightness or saturation of the image data converted in said first and second hue conversion steps in accordance with conversion characteristics determined by hue angles of the image data after the hue conversion, wherein the image data after the hue conversion is converted into image data in excess of a monitor color reproduction range by using the conversion characteristics for saturation.

42. An image processing apparatus comprising:

first hue conversion means for shifting image data having a first hue by a first hue angle;

second hue conversion means for shifting the image data having a second hue different from the first hue by a second hue angle different from the first hue angle; and conversion means for converting at least lightness or saturation of the image data converted by said first and second hue conversion means in accordance with conversion characteristics determined by hue angles of the image data after the hue conversion, wherein the image data after the hue conversion is converted into image data in excess of a monitor color reproduction range by using the conversion characteristics for saturation.

43. A storage medium storing a program which comprises:

a first hue conversion step, of shifting image data having a first hue by a first hue angle;

a second hue conversion step, of shifting the image data having a second hue different from the first hue by a second hue angle different from the first hue angle; and a conversion step, of converting at least lightness or saturation of the image data converted in said first and second hue conversion steps in accordance with conversion characteristics determined by hue angles of the image data after the hue conversion, wherein the image data after the hue conversion is converted into image data in excess of a monitor color reproduction range by using the conversion characteristics for saturation.

44. A program comprising:

a first hue conversion step, of shifting image data having a first hue by a first hue angle;

a second hue conversion step, of shifting the image data having a second hue different from the first hue by a second hue angle different from the first hue angle; and a conversion step, of converting at least lightness or saturation of the image data converted in said first and second hue conversion steps in accordance with conversion characteristics determined by hue angles of the image data after the hue conversion, wherein the image data after the hue conversion is converted into image data in excess of a monitor color reproduction range by using the conversion characteristics for saturation.

45. An image processing method comprising:

a first hue conversion step, of shifting a first hue of image data by a first hue angle;

a second hue conversion step, of shifting a second hue of the image data different from the first hue by a second hue angle different from the first hue angle;

a conversion step, of converting at least lightness or saturation of the image data converted in said first and second hue conversion steps in accordance with conversion characteristics determined by hue angles of the image data after the hue conversion, wherein hue shift and conversion characteristics in said first and second hue conversion steps are determined by setting of a printer driver.

46. An image processing apparatus comprising:

first hue conversion means for shifting image data having a first hue by a first hue angle;

second hue conversion means for shifting the image data having a second hue different from the first hue by a second hue angle different from the first hue angle; and conversion means for converting at least lightness or saturation of the image data converted by said first and second hue conversion means in accordance with conversion characteristics determined by hue angles of the image data after the hue conversion, wherein hue shift and conversion characteristics to be used by said first and second hue conversion means are determined by setting of a printer driver.

47. A storage medium storing a program which comprises:

a first hue conversion step, of shifting image data having a first hue by a first hue angle;

a second hue conversion step, of shifting the image data having a second hue different from the first hue by a second hue angle different from the first hue angle; and a conversion step, of converting at least lightness or saturation of the image data converted in said first and second hue conversion steps in accordance with conversion characteristics determined by hue angles of the image data after the hue conversion, wherein hue shift and conversion characteristics to be used in said first and second hue conversion steps are determined by setting of a printer driver.

48. A program comprising:

a first hue conversion step, of shifting image data having a first hue by a first hue angle;

a second hue conversion step, of shifting the image data having a second hue different from the first hue by a second hue angle different from the first hue angle; and a conversion step, of converting at least lightness or saturation of the image data converted in said first and second hue conversion steps in accordance with conversion characteristics determined by hue angles of the image data after the hue conversion, wherein hue shift and conversion characteristics to be used in said first and second hue conversion steps are determined by setting of a printer driver.

49. An image processing method, comprising the steps of changing independently component values of hue and saturation of an input image represented by image data, wherein a change amount of the hue is made different at each hue angle and a change amount of the saturation is made different at each hue angle and each saturation value, and wherein the input image is approximated to stored colors or stored colors of the input image are emphasized according to the changes of the hue and the saturation.

50. An image processing method according to claim 49, wherein lightness of which the change amount is made different at each hue angle is converted.

51. An image processing method according to claim 49, wherein the hue angle is divided into a plurality of hue angle groups, a target hue value is set to each hue value in each divided hue angle group, and each hue value is divided.

52. An image processing method according to claim 49, wherein the saturation value is partitioned into a plurality of sections for each hue angle in each divided hue angle group, a target saturation value is set to each saturation value partitioned, and each saturation value is converted.

53. An image processing method according to claim 49, wherein a color table is formed by converting the hue and the saturation on the basis of a certain color space.

* * * * *